UNITED STATES PATENT OFFICE.

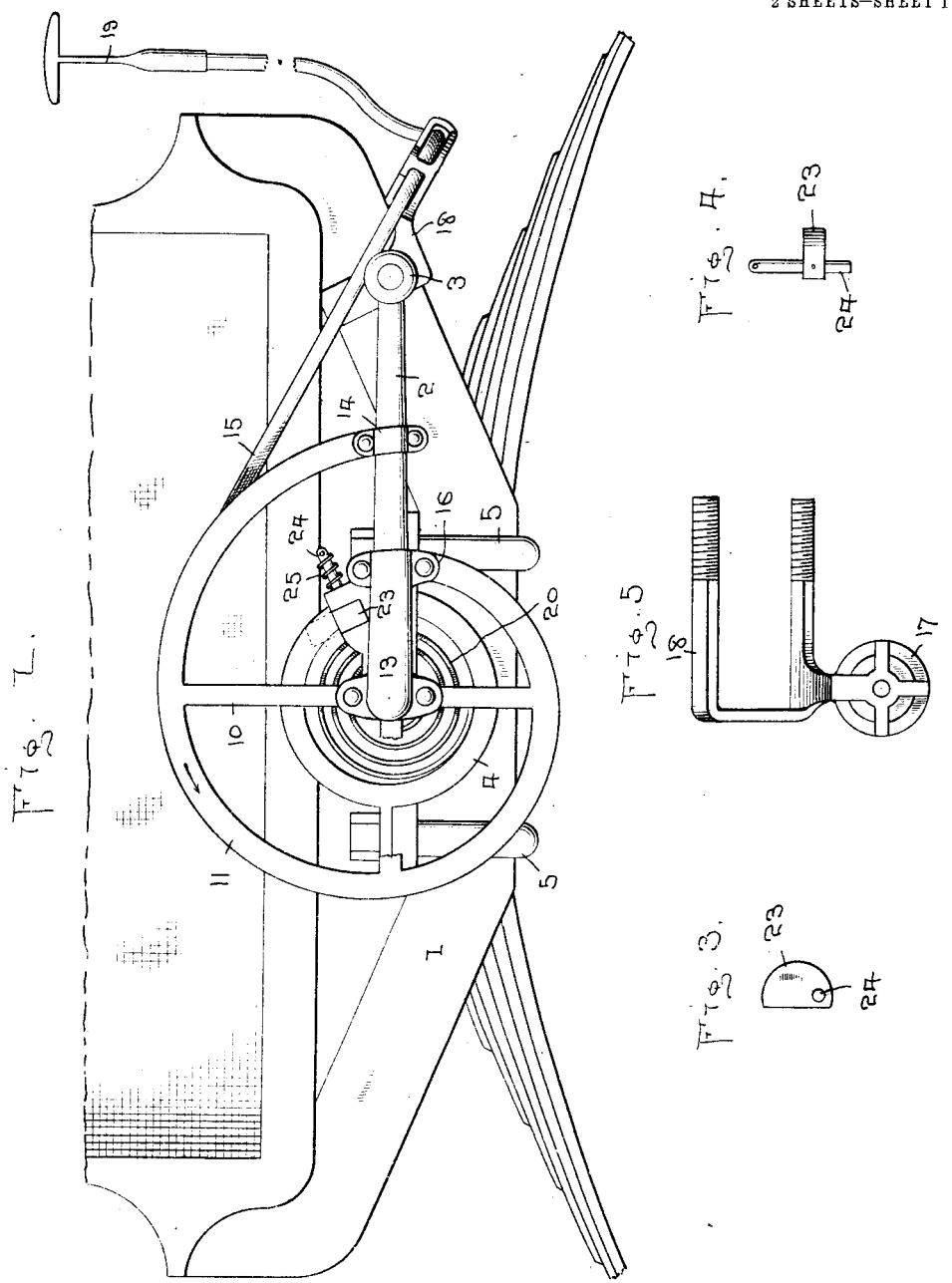

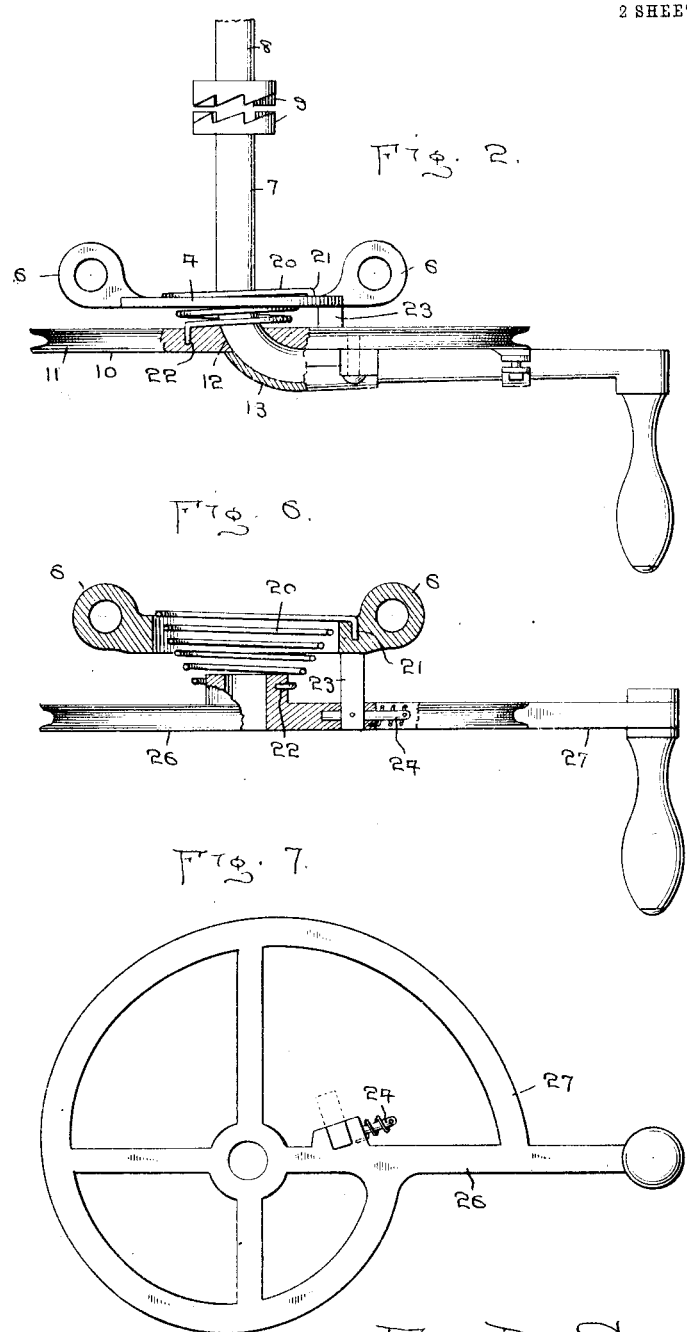

ANTON I. SANDBO, OF LANSFORD, NORTH DAKOTA, ASSIGNOR, BY MESNE ASSIGNMENTS, TO THE SANDBO STARTER COMPANY, OF ROCKFORD, ILLINOIS, A CORPORATION OF ILLINOIS.

ENGINE-STARTER.

1,128,055.  Specification of Letters Patent.  Patented Feb. 9, 1915.

Application filed May 22, 1913. Serial No. 769,243.

*To all whom it may concern:*

Be it known that I, ANTON I. SANDBO, a citizen of the United States, residing at Lansford, in the county of Bottineau and State of North Dakota, have invented certain new and useful Improvements in Engine-Starters; and I do hereby declare the following to be a full, clear, and exact description of the invention, such as will enable others skilled in the art to which it appertains to make and use the same.

This invention relates to engine starters for motor vehicles, and is of the type known as manually operable.

An object of the invention is to provide a handle, conveniently close to the driver of the motor vehicle having connection with the starting crank, and by means of which initial movement may be imparted to the engine shaft.

A further object is to provide means for automatically disengaging the crank shaft from the engine shaft at the end of the starting operation.

A further object is to provide a device of this character which may be cheaply constructed and conveniently applied to the ordinary forms of motor vehicles.

In the accompanying drawings, Figure 1 represents a front elevation of a portion of an automobile, showing my improved starter attached thereto. Fig. 2 represents a top view partly in section of parts of my invention detached. Fig. 3 represents a side elevation of a cam member. Fig. 4 represents an end view thereof. Fig. 5 represents a side elevation of a pulley and the supporting bracket therefor. Fig. 6 represents a top view partly in section of a slightly modified form of the invention, and, Fig. 7 represents a side elevation thereof.

Referring to the drawings wherein similar reference numerals designate corresponding parts throughout the several views, the numeral 1 indicates the front cross beam of the frame of an automobile or motor truck, and 2 the ordinary starting crank projecting forwardly therefrom and having the handle 3 on the outer end. An annular ring 4 having a plane front face is disposed against the cross beam 1 and secured in position thereon by the tie bolts 5 receiving said beam and extending through the apertured ears 6 of the ring. The ring 4 surrounds the crank shaft 7 and is concentric therewith. The crank shaft 7 and the engine shaft 8 are adapted for rotation when the former is moved inwardly to engage the parts of the clutch 9.

A wheel 10 having a peculiarly shaped channel rim 11 and a curved bore 12 is disposed over the crank shaft 7 and secured against the crank 2 by a suitable securing member 13. One end of the rim 11 is fixed to the securing member 13 a short distance from the crank shaft 7, and said rim is extended therefrom in the substantial form of a scroll having the outer end secured at 14 to the crank 2.

A flexible connection 15 is positioned in the channel of the rim 11 and is secured at one end to the inner end of said rim at 16 and is extended over a pulley 17 mounted in a suitable bracket 18, secured to the cross beam 1 and extended upwardly adjacent the seat of the driver of the motor vehicle. A suitable handle 19 is attached to the free end of the flexible connection 15 by means of which the same is operated.

A coiled spring 20 having the end 21 secured in the annular ring 4 and the opposite end 22 in the hub of the wheel 10 is adapted to rotate the latter in the direction of the arrow shown in Fig. 1, and is also adapted to move said wheel together with the crank shaft inwardly to lock the clutch member 9.

A cam member 23 is fixedly mounted upon a shaft 24 journaled in the frame of the wheel 10 adjacent the annular ring 4. One end of the shaft 24 projects outwardly of the frame of the wheel 10 and is provided with a spring 25 adapted to normally rock the cam member 23 with said shaft 24 to hold the cam 23 in constant contact with the ring 4 to normally hold the starting device out of engagement with the engine shaft when not in use.

In the modifications disclosed in Figs. 6 and 7, the crank arm 26 and scroll wheel 27 are formed integral and are adapted to be attached to a crank shaft of which the crank is removable.

When it is desired to start the engine, the operation of my invention is as follows: The flexible connection 15 is pulled by the operator by means of the handle 19 attached thereto, said connection working over the pulley 17 and attached at its opposite end to the frame of the wheel 10 will obviously rotate the latter. Initial movement of the wheel 10 rocks the cam member 23 which has its cam surface engaged against the front face of the annular ring 4 in the reverse direction against the action of the spring on the shaft 24, and thus permits the crank shaft 7 and parts attached thereto to move inwardly by the tension of the spring 20. Consequently, the parts of the clutch 9 are locked and further rotary movement of the wheel 10 is imparted to the engine shaft 8. It will be apparent that by the peculiar construction of the rim 11, greater leverage is obtainable upon the crank shaft 7 and engine shaft 8 at the beginning of the starting operation and that such leverage gradually decreases as the operation progresses and the momentum of the engine is increased. After the flexible connection 15 has been pulled to its limit, the handle 19 is released and the tension of the spring 20 automatically returns the wheel 10 to its normal position, or that shown in Fig. 1 and at the same time the tension of the spring 25, mounted over the shaft 24, tends to rock the cam 23 upon its pivot, and the latter riding upon the surface of the annular ring 4, will force the wheel 10 and crank 2 outwardly and consequently disengage the parts of the clutch 9, thus restoring the device to its normal position after each starting operation.

What I claim is:—

1. A starting device for engines comprising a starting shaft, part of a clutch carried by one end of said shaft and adapted for engagement with another part carried by the engine shaft, a wheel secured to the opposite end of said starting shaft, a scroll shaped rim for said wheel, a flexible connection secured at one end to one end of said rim and extending thereover, a handle carried by the opposite end of said flexible connection, a circular stationary member, means interposed between the circular member and wheel for automatically returning said wheel to initial position after each operation thereof, and a cam co-acting with the circular member for disengaging said clutch after each operation of the starting device, said cam being actuated by its reverse travel upon said stationary member.

2. A starting device for motor vehicles, comprising a wheel having a scroll shaped rim, a flexible connection secured at one end to said rim, a handle secured to one end of said flexible connection, a stationary ring member, means interposed between said wheel and the ring member for restoring said wheel to its normal position after each operation, and a spring actuated cam arranged upon said wheel for engaging the face of said ring member for moving said wheel outwardly after each operation to normally hold said wheel in an inoperative position.

In testimony whereof I have signed my name to this specification in the presence of two subscribing witnesses.

ANTON I. SANDBO.

Witnesses:
 N. E. KLECKNER,
 ELIZABETH SHEPARD.